United States Patent [19]

Lansinger et al.

[11] Patent Number: 4,550,675
[45] Date of Patent: Nov. 5, 1985

[54] SELF-ADJUSTING SHIFT INDICATOR FOR AUTOMATIC TRANSMISSION

[75] Inventors: Jere R. Lansinger, Bloomfield Hills; George D. Dorr, Troy; Paul L. Farago, Royal Oak, all of Mich.

[73] Assignee: Chrysler Corporation, Highland Park, Mich.

[21] Appl. No.: 480,975

[22] Filed: Mar. 31, 1983

[51] Int. Cl.$^4$ .................................................. G09F 9/40
[52] U.S. Cl. .................................. 116/28.1; 116/281; 116/282; 116/DIG. 20; 116/DIG. 21; 74/10.7
[58] Field of Search .............. 116/28.1, 291, 327, 116/283, 281, 282, DIG. 20, DIG. 21; 74/10.7

[56] References Cited

U.S. PATENT DOCUMENTS

| | | | |
|---|---|---|---|
| 444,077 | 1/1891 | Thompson | 116/283 |
| 2,111,694 | 3/1938 | Schroder | 74/10.7 |
| 2,669,964 | 2/1954 | Wexler | 116/324 |
| 3,132,627 | 5/1964 | Lesatz | 116/281 |
| 3,815,543 | 6/1974 | Bush | 116/288 |
| 3,830,192 | 8/1974 | Ronewicz | 116/28.1 |

Primary Examiner—Steven L. Stephan
Assistant Examiner—Denis E. Corr
Attorney, Agent, or Firm—Edward P. Barthel

[57] ABSTRACT

A self-adjusting selector dial shift indicator mechanism is disclosed for an automatic transmission control system. The system includes a carriage assembly having a carrier member and an indicator member slidably interlocked by resilient biasing means for joint longitudinal movement on a support housing. A pair of stops on the housing limit the reciprocal travel of the indicator member at opposite end positions wherein its pointer is aligned respectively with the dial low-drive and park indicia. A first cable section connects the carrier member to the housing. A second cable section connects the carrier to the shift lever steering column tube. Movement of the shift lever from low-drive to park overcomes the biasing means allowing the carrier member to slip relative to the indicator member at each end of the dial automatically indexing its pointer wherein manual adjustment of the cable section is eliminated. The indicator member arrangement allows light to be received by the pointer throughout its travel from a concealed light source.

3 Claims, 8 Drawing Figures

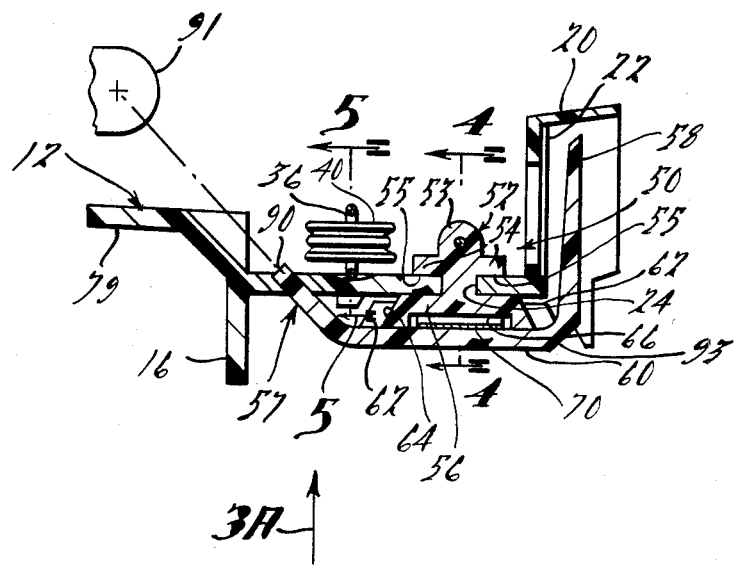

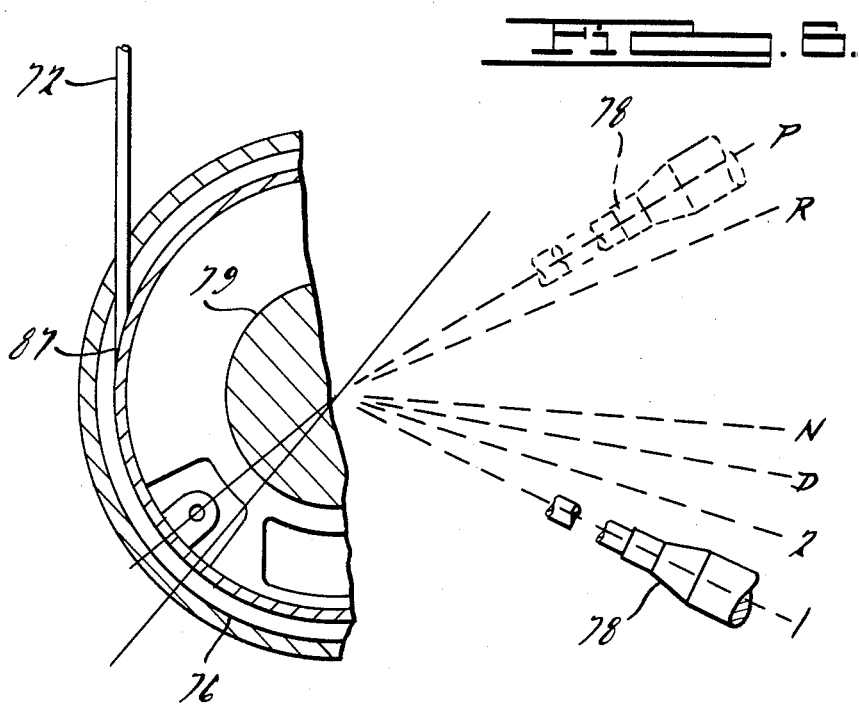
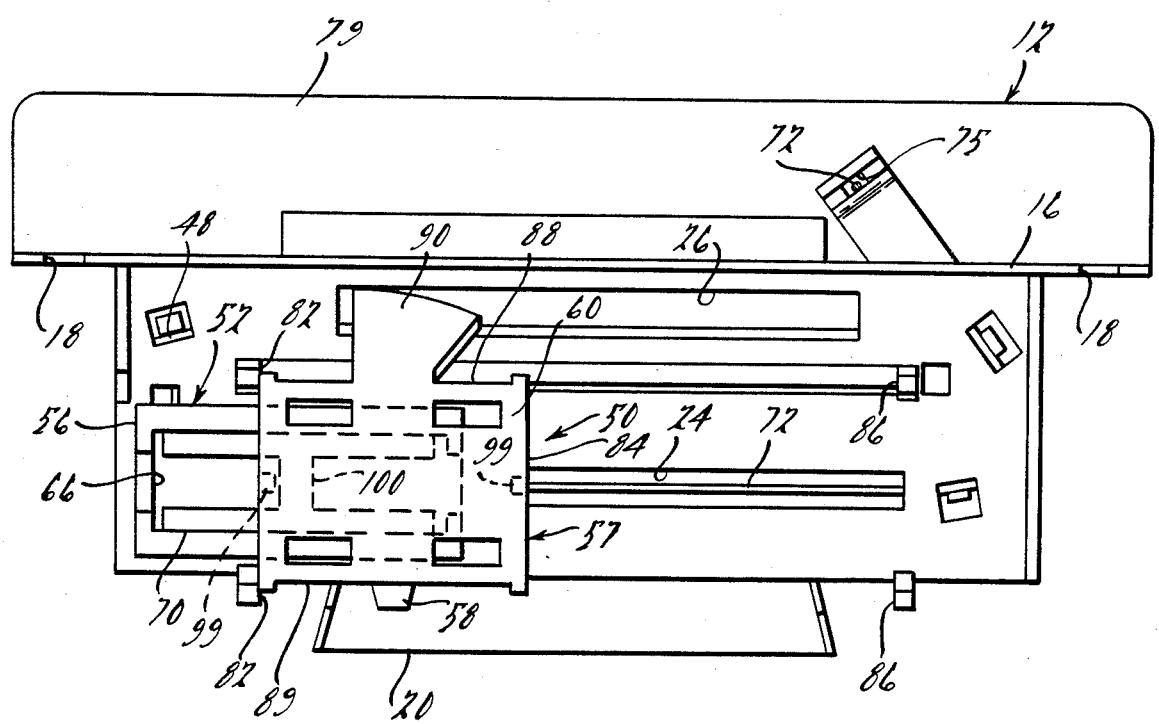

SELF-ADJUSTING SHIFT INDICATOR FOR AUTOMATIC TRANSMISSION

BACKGROUND OF THE INVENTION

The present invention relates to a shift indicator mechanism for an automatic transmission and more particularly to an improved indicator wherein the selector pointer is automatically indexed after being shifted throughout a full traverse of the dial.

Indicator mechanisms for automatic transmissions typically include a housing having a dial face with spaced indicia representing different transmission settings such as park, reverse, neutral, normal drive, second speed ratio drive, and a first speed ratio. A pointer is slidable on the housing for reciprocal movement with the pointer adapted to be aligned with each of the dial indicia. A coil spring has one end fixed to the housing and its free end connected in a carrier member supporting the pointer. An actuator cable, attached between the carrier and a steering column sleeve, is moved according to tension in the springs.

It has long been a problem to assemble known indicator mechanisms with the pointer aligned with all the dial indicia. As discussed in the U.S. Pat. No. 3,830,192 to Ronewicz et al, issued Aug. 20, 1974, various adjusting nuts and releasable retainer clips are used which require manual adjustment by the installer to compensate for variations in the distance between the actuator cable connections. The Ronewicz et al patent discloses a pivoting indicator lever and slip clutch arrangement whereby one-time calibration of the dial is achieved using a control cable which is adjusted relative to its fixed sheath.

It should be noted that prior art indicators, as shown by Ronewicz et al for example, can be jarred out of adjustment during normal operation of the car caused by severe bumps, road vibration etc. Heretofore, to fix the indicator so that the pointer properly registers with the indicia required substantial disassembly and readjustment.

SUMMARY OF THE INVENTION

An object of the present invention is to provide an improved automotive transmission selector dial shift indicator mechanism which can be automatically indexed by the driver upon moving the manual shift indicator lever pointer through a full sweep from its low drive to its park indicia.

It is another object of the invention to provide a transmission ratio indicator as set forth above wherein the selector pointer is illuminated by light rays from a single stationary source throughout the pointer's reciprocal travel.

In carrying out the foregoing, and other objects, a transmission gearshift indicator mechanism has a carriage assembly including a carrier member and an indicator member. The members are slidably interlocked and retained on a housing for joint movement by biasing spring means located therebetween. Integral stops on the housing limit the reciprocal travel of the indicator member to its two extreme opposite positions such that a pointer on the indicator member is aligned respectively, with the Low drive (1) and Park (P) dial indicia.

A first control cable section is fixed to one end of the carrier member and is looped, in turn, around a fixed reel and a pulley on the free end of a coil tension spring. The spring other end is anchored to the housing. A second control cable section is connected between the other end of the carrier member and the shift lever tube on the steering column. The carrier member has grooves received in a housing guide slot. When the indicator member contacts a stop at one end of its travel the carrier member can slip relative to the indicator member upon overcoming the resilient biasing force between the carrier and the indicator members. Slippage results from the coil spring pull on the first cable section with the carrier member at one end of its travel and by pull of the manual selector lever on the second cable section at the other end of its travel.

These and other objects and advantages of the invention will be more apparent from the following description and drawings:

BRIEF DESCRIPTION OF THE DRAWINGS

FIG. 3 is a vertical transverse sectional view, partly in section, taken on line 3—3 of FIG. 2;

FIG. 4 is an enlarged, fragmentary, vertical longitudinal sectional view taken on the line 4—4 of FIG. 3;

FIG. 5 is an enlarged, fragmentary, vertical sectional view taken on the line 5—5 of FIG. 3;

FIG. 6 is a fragmentary diagrammatic cross-sectional view of the steering column; and FIG. 7 is an enlarged plan view of the assembly underside showing the biasing spring means of FIG. 4.

DETAILED DESCRIPTION OF THE INVENTION

Figure 1:
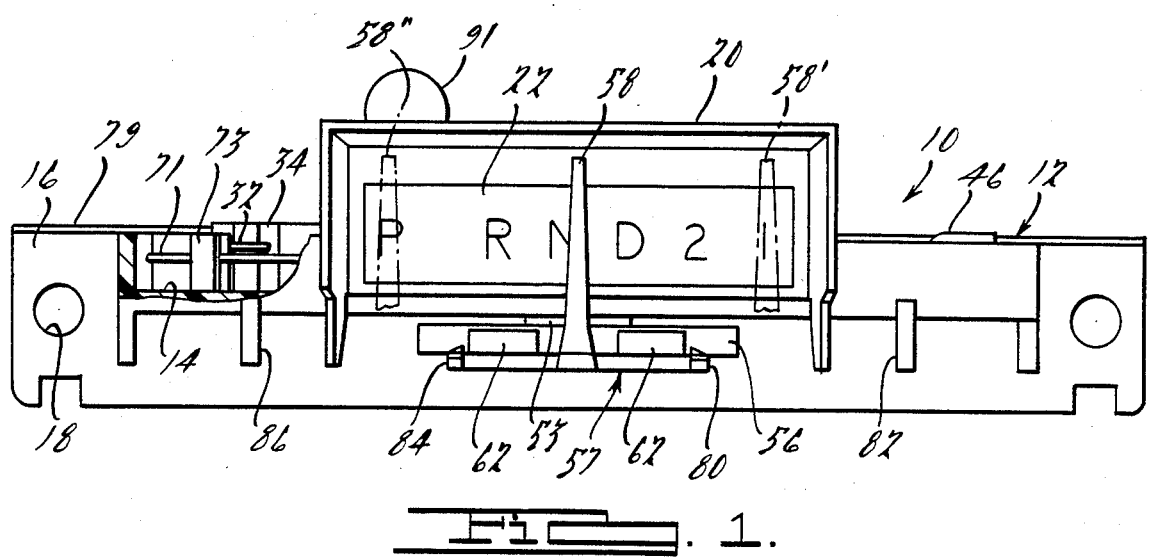
FIG. 1 is a front elevational view of a transmission ratio indicator assembly made in accordance with the present invention.
Figure 2:
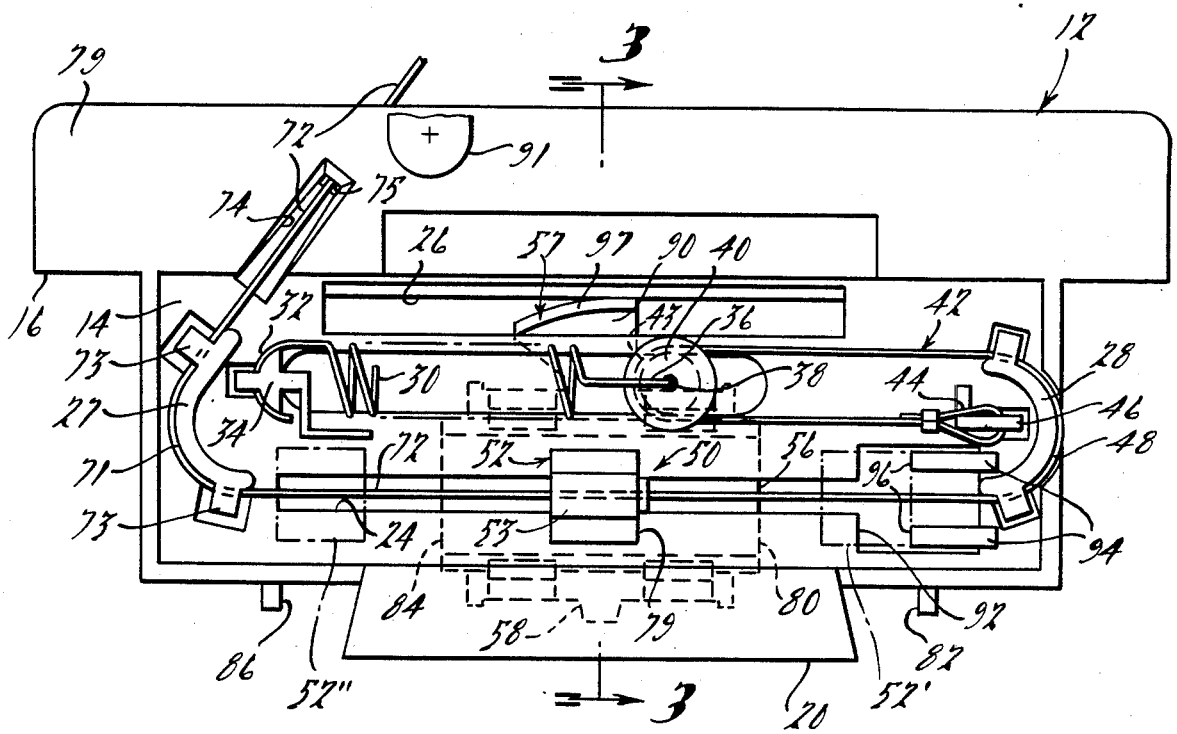
FIG. 2 is a top elevational view of the indicator assembly.

Referring now to the drawings and more particularly to FIGS. 1 and 2 wherein an indicator assembly, generally shown at 10, comprises a housing 12 having a mounting base 14. The housing 12 includes an angle-sectioned support including a vertical mounting flange 16 through which holes 18 are formed to permit attachment of the housing to the instrument panel of an automotive vehicle. A frontal upstanding housing frame portion 20 extends toward the vehicle driver from the housing. An indicia plate member 22 is secured to the frame portion 20 on which shift indicator designations are displayed on the plate face. The indicias are "P" for park, "R" for reverse, "N" for neutral, "D" for drive, "2" for second and "1" for low drive mode.

The base structure 14 has formed thereon a front elongated longitudinally extending guide means or slot 24 and a rear slot 26. The guide opening 24 extends longitudinally between a pair of opposed substantially half-round or C-shaped reel elements 27 and 28. A coil tension spring 30 extends longitudinally on the base 14 and has one lefthand hooked end 32 connected to an upstanding lefthand post 34 formed integral with the base. The spring's other righthand opposite hooked end 36 extends through a central hole 38 of a pulley 40. The pulley 40 is oriented with its pivotal axis normal to the plane of the base 14.

As seen in FIG. 2 a first flexible cable section 42 is return-looped around the pulley 40. The first cable section 42 has one end 44 anchored to the righthand post 46 located at the center of the radius of curvature of the right-hand C-shaped reel element 28. The first cable section 42 other end is return-looped at 48 around the reel element 28 and extends leftwardly where it is secured to a carriage assembly 50.

The carriage assembly includes a carrier member 52 mounted for longitudinal reciprocal travel in base guide slot 24. The carrier member 52 is formed with a head section 53 having a pair of arms 54 defining opposed grooves 55 with an elongated sled 56. The grooves 55 slidably receive the opposed edges of the opening slot 24.

The carriage assembly 50 additionally includes an indicator member 57 having a pointer 58 extending upwardly from its floor pad 60. The upper surface of pad 60 has two pair of opposed chamfered guide tabs 62 laterally spaced to define a channel therebetween. The carrier member 52 has its slide side edges 64 outwardly sloped complementary to the inwardly chamfered tabs to provide interlocking scarf-like engagement surfaces therebetween.

The carrier member undersurface has a recess 66 sized to receive an "H" shaped resilient spring clip 70 therein as best seen in FIG. 4. The clip 70 is bowed downwardly about its transverse center axis to resiliently maintain biased engagement between the sled 56 of the carrier member 52 and the pad 60 of the indicator member 57.

The carrier member head 53 lefthand end is secured to a second cable portion 72 which extends longitudinally (FIG. 2) leftwardly and is looped at 71 around the reel element 27. The cable portion 72 is threaded under reel guides 73 and through an open-ended housing slit 74. The cable extends tangentially from reel 27 downwardly through opening 75 in angle flange 79 for operative connection to a conventional steering column shift tube 76 movable by a drive selector lever 78 shown schematically in FIG. 6.

The carriage assembly 50, which includes the carrier member 52 and the indicator member 57, is moved longitudinally toward the left or park position upon the rotation of the shift tube 76 in a counterclockwise direction by the selector shift lever 78. This rotation from low drive to park exerts a pull on the control cable portions 42 and 72 against the opposing force of the expanding oil spring 30.

The carriage assembly 50 movement to the right toward the low drive position, caused by rotation of the column sleeve 76 in a clockwise direction results from the coiled spring 30 tension force as the spring returns towards its collapsed unstressed state. The indicator member 57 moves to the right with the carrier member 52 until the indicator member righthand end 80 contacts housing righthand indicator stops 82. At this position, shown in the underside view of FIG. 7, the indicator pointer 58 is aligned with the low drive terminal indicia "1" as shown by its phantomed position 58' in FIG. 1. In the underside view of FIG. 7 the carriage assembly 50 is located at the low drive range position of the transmission.

With the indicator pointer 58 aligned at the terminal indicia "1" however, the shift lever 78 and column tube 75 may not have moved the transmission manual valve (not shown) to its low drive position because of tolerance build-up in the system. At this point the coil spring tension force exerted on the cable portions 42 and 72 overcomes the biasing force of spring clip 70 and allows the carrier member 52 to slip further to the right. This lost-motion slippage provides slack in the cable sections for continued contraction of the coil spring. The overtravel slippage of the carrier member 52 and the cable sections 42 and 72 obviate the need for adjusting or reconnecting the cable section 72 with the steering column's shaft tube 76.

The next step in the alignment process involves moving the selector lever 78 in a counter clockwise direction toward the park position. The carrier member 52 and indicator member 57 are moved jointly against the opposing tension force of the coil spring 30 as the spring is extended by the pull on the cable sections. The indicator member 57 moves to the left with the carrier member 52 until the indicator member's lefthand end 84 contacts lefthand indicator stops 86. At this position the indicator pointer 58 is aligned with the park indicia "P" as shown by its phantom line position 58" in FIG. 1.

In a like manner described above for the low drive setting, when the pointer 58 is aligned with the indicia "P" the shift lever 78 and column tube 76 may not have moved the transmission to its park engagement position because of tolerance build-up in the system. The shift lever 78 force exerted on the cable portions 42 and 72 overcomes the biasing force of spring clip 70. This allows the carrier member 52 to slip further to the left providing extension of the cable sections by continued extension of the coil spring. This results in the additional slack adjustment in the cable sections 42 and 72 created by the slippage of the carrier member 52 to the left.

As seen in FIG. 2 the control cable first section 42 has a first return-loop or bight portions 43 formed around the pulley 40 and a second return-loop or bight portion 48 formed around the righthand reel 28. By virtue of the cable section 42 defining first and second bight portions the pulley 40 travels a predetermined longitudinal distance less than the travel "L" of the pointer 58 between its two extreme indexed stop positions 58' and 58". In ths instant case the cable sections 80 and 81 each travel longitudinally about one-half the distance the pointer 58 travels between its two 58' and 58" extreme terminal positions. One advantage to this novel arrangement is that the coil spring 30 is always held under a tension load, i.e. the coil spring never retracts to its unstressed or rest mode.

Further, a compact structure is provided because the pulley 40 arrangement; that is, the pulley 40 travels a longitudinal distance about one-half the distance the carrier member 52 travels. Thus, as a result when the pointer 58 is aligned with the low drive indicia "1" the coil spring 30 continues to exert a tension force on the cable sections. This force causes the carrier member 52 to overcome the biasing force of leaf spring 70 allowing the carrier member to continue its rightward travel until the selector lever 78 arrives at its low speed position. Conversely, as the pointer 58 is aligned with the park indicia "P" the selector lever can be further rotated counter clockwise until the transmission is locked in its park mode. Thus, by applicants' unique arrangement the pointer 58 is automatically set during production by the installer moving the selector lever clockwise to its low drive position "1" and then rotating the selector lever counter clockwise to its park position "P".

In the disclosed embodiment of the invention it will be noted in FIG. 6 that the predetermined arcuate travel of the selector lever 78 and shift tube or bowl 76 about the shaft 79 of the steering column is about 50 degrees. A feature of the invention provides circumferential or rotary travel of the connection with the cable section 72 on the tube 76, shown at 87, to be slightly greater than the linear distance the pointer 58 travels between its two extreme terminal positions, i.e. aligned with either "P" or "1" on the dial. Such an arrangement insures that the indicator member 57 will always contact the stops 82 or 86 before the selector lever places the transmission in either its park or low-drive mode, respectively. This arrangement permits the needed "lost-motion" travel of the carrier 52 relative to the indicator member 57 thereby adjusting for any production tolerances of the system.

In the preferred embodiment the indicator member 57 is molded of a clear transparent plastic material. The indicator member side edge 88 opposite from pointer edge 89 has an integrally molded tongue portion 90 arranged in near relationship with a light source such as bulb 91. In this way light from the bulb 91 is effectively guided through the tongue 90, the pad 60 whose light reflecting surface 93 directs the light rays toward the top of the pointer 58 for illumination thereof. See U.S. Pat. No. 2,287,605 assigned to the assignee of this invention.

Figure 3A:
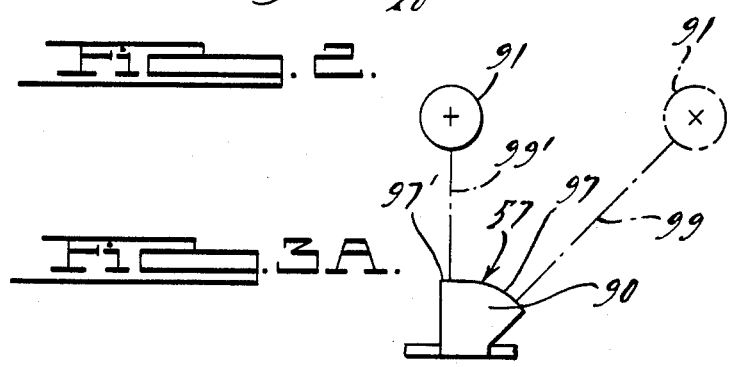
FIG. 3A is a schematic view shown by arrow 3A.

It will be seen in the schematic view FIG. 3A of the indicator member tongue 90, looking in the direction of arrow 95 in FIGS. 3, that throughout its travel the tongue edge surface always has a portion thereof oriented substantially normal to an imaginary direct line passing through the center of the bulb 91.

As viewed in FIG. 2, the slot 24 has an enlarged rectangular shaped opening 92 at its righthand end which allows the insertion of the carrier groove 55 in the slot edges. A pair of resilient locking legs 94 are provided on the base 14 which flex to receive the carrier in the opening 92. The legs 94 have feet portions 96 which contact the carrier right-end surface 98 to prevent the carrier from being inadvertently dislodged from its travel in slot 24.

Thus, when the indicator 57 is at the location of FIG. 7 wherein the pointer 58 is at the low drive position 58' the light ray direct path, shown by immaginary line 99', contact the tongue at its edge surface portion 97 oriented about 45° to the direction of travel of the carrier 57. Conversely, when the indicator 57 is in the location wherein the pointer 58 is aligned with its park position 58" the light ray direct path, shown by immaginary line 99', contacts the tongue at its edge surface 97' oriented substantially parallel to the direction of travel of the carrier 57. By means of this arrangement, it will be seen that throughout the travel of the carrier 57 direct light rays from the bulb 91 will always impinge on a portion of the tongue edge surface that is oriented normal to the direct light ray path from the single bulb 91.

In the disclosed form, because the light bulb 91 is located adjacent to the "park" end of the indicator travel, it necessitates the asymmetrical fan-like shape of the tongue. Thus, if the bulb 91 were located equidistant between the terminal indicia "park" and "low drive" on indicia dial 22 the tongue 57 would have a symmetrical fan-like shape wherein the direct light rays from the bulb 91 would always impinge on a portion of the tongue edge surface oriented normal to the direct light rays of the bulb.

Although but one embodiment of the invention is herein shown and described, it will be understood that various changes in the size, shape and arrangement of parts may be made without departing from the spirit of the invention and it is not the intention to limit said invention other than by the terms of the appended claims. For example, the invention contemplates that the second cable section could be attached to a shift lever of a floor mounted shifter.

I claim:

1. An automatic transmission selector indicator mechanism for use with a vehicle transmission control system comprising a housing having a dial in the form of a plate member associated therewith displaying a plurality of spaced indicia corresponding to different transmission settings, said plurality of indicia including a first low drive range terminal indicia and a second park terminal indicia each at a respective extreme end of the dial, a carriage assembly supported on the housing in a longitudinally extending guide slot having parallel side edges, said carriage assembly operative for longitudinal movement in said guide slot relative to said housing in opposite directions between first and second stop means on said housing, said carriage assembly comprising a carrier member and an indicator member, said indicator member in the form of a rectangularly shaped pad disposed in a horizontal plane beneath said housing guide slot, said pad having its upper surface formed with a plurality of opposed inwardly chamfered guide tabs laterally spaced to define a chamber therebetween, said carrier member formed with an upper head section and a lower rectangularly shaped sled, said sled having each of its longitudinal side edges outwardly sloped complementary to its associated inwardly chamfered guide tabs thereby providing interlocking scarf-like engagement relatively slidable surfaces therebetween, such that carrier member may slide in either longitudinal direction in said channel relative to said indicator member upon said indicator member contacting respective ones of said first or second stop means, a resilient spring clip interposed between said sled and said pad for biasing said sled and said pad engaging surfaces into frictional engagement to frictionally oppose longitudinal sliding movement of said indicator member relative to said carrier member, such that said carrier and indicator members are adapted for conjoint longitudinal movement between said first and second stop means, said pointer adapted to be aligned, respectively, with either said first or second terminal indicia upon said pad contacting respective ones of said first and second stop means, a coil spring on said housing with its principal axis disposed horizontally for movement in a direction parallel to said guide slot, said spring having one end connected adjacent one end of said housing and its other end supporting a pulley for rotation about a substantially vertical axis, flexible cable means including first and second cable sections disposed in a common horizontal plane including said coil spring principal axis, said first cable section secured between one end of said carrier member upper head portion and the other end of said housing, said first cable section having a first bight portion return-looped around said pulley and a second bight portion return-looped around a housing arcuate reel, such that the tension force of said coil spring urging said pulley toward said housing one end, means for securing said second cable section between the other end of said head portion and said selector lever assembly on the vehicle, whereby said pulley travels a predetermined longitudinal distance less than the longitudinal travel of said pointer between its two extreme indexed stop positions causing said coil spring to be always maintained under a tension load force, said carriage assembly movable in one longitudinal direction between said housing first and second stop means in response to rotary movement of said lever between its park and low drive range positions, such that upon said pad contacting said first stop means the tension load force of said coil spring overcoming the force of said resilient spring clip, whereby said carrier member is free to slip in said one direction relative to said indicator member by means of said engaging surfaces until said lever places the transmission into its first low drive range position, and whereby upon said carriage assembly being moved in the opposite direction by reverse movement of said lever said pad contacting said second stop means such that continued movement of the selector lever overcoming the resilient spring clip force, whereby said carrier member is free to slip in said other longitudinal direction relative to said indicator member until movement of said lever puts the transmission into its second park position, said indicator mechanism causing said pointer to be automatically aligned, respectively, with each said low drive range and park terminal indicia each time said lever is cycled between its low drive range and park positions.

2. The transmission indicator is defined in claim 1 wherein said indicator member being formed from clear transparent plastic material with said pointer extending vertically from said pad forward longitudinal edge and a tongue portion being canted at an upwardly acute angle from the aft longitudinal edge of said pad, said tongue defining a side edge surface formed with a predetermined arcuate surface, whereby said arcuate surface maintains a portion thereof oriented normal to direct light rays from a single concealed light bulb of the vehicle so as to illuminate said pointer throughout its longitudinal travel.

3. The indicator mechanism as recited in claim 2 wherein, said tongue edge surface is assymmetrical in shape such that the tongue portion one side edge extends normal to the carrier assembly longitudinal direction of travel, and the tongue portion other side edge extends at a predetermined acute angle to the carriage assembly longitudinal direction of travel, whereby said arcuate edge surface maintains a portion thereof oriented normal to direct light rays from said single light bulb with said light bulb located adjacent one end of said carriage assembly longitudinal path of travel.

* * * * *